Nov. 3, 1953

J. A. BOREL 2,657,850

AUTOMATIC REGULATOR FOR COMPRESSORS

Filed Nov. 21, 1949

INVENTOR

Joseph Abel Borel

BY

Cameron, Kerkam & Sutton

ATTORNEYS

Patented Nov. 3, 1953

2,657,850

UNITED STATES PATENT OFFICE 2,657,850

AUTOMATIC REGULATOR FOR COMPRESSORS

Joseph Abel Borel, Paris, France, assignor to Societe Schneider and Cie, Paris, France, a partnership of France Application November 21, 1949, Serial No. 128,641
Claims priority, application France November 25, 1948

10 Claims. (Cl. 230—24)

In a compressor driven by an electric motor or an internal combustion engine or the like and required to deliver a constant pressure, being fed at a pressure, which may vary between more or less widely spaced limits, it is important from an economic point of view to regulate the operation of the compressor in such a way that the power required from the motor or the engine should also be approximately constant.

It is therefore an object of the present invention to provide for compressors of the positive displacement type with constant discharge pressure, an automatic regulator which will automatically control the compressing process in such a manner that for a variable inlet pressure the required power will be approximately constant.

It is a further object of the present invention to provide a novel automatic regulator for compressors which is of simple construction and which is efficient and reliable in operation.

The novel regulator of the present invention includes a relief valve which is mounted in the cylinder of the compressor if the latter is a single stage compressor, or is mounted in the first cylinder of the compressor if the latter is a multiple stage compressor. This relief valve is mounted in the cylinder, in known manner, to regulate the compression ratio in said cylinder by remaining open during a part or all of the compression stroke to control the point at which effective compression begins. This relief valve is hydraulically operated by a pump having an adjustable output. The plunger of this pump is driven by a cam carried by the crank shaft of the compressor to furnish for each compression stroke the power required to open the relief valve. The plunger of the pump includes a ramp which controls the volume of liquid subject to the action of the pump, as will more fully appear hereinafter, and thus controls the operation of the relief valve.

This new automatic compressor regulator also includes an auxiliary servo-motor to regulate the liquid output of the pump. This servo-motor includes a movable member which is displaced by variations in the intake pressure of the compressor and which is connected to the plunger of the pump so as to adjust it angularly and by such angular adjustments automatically control, in accordance with variations in the intake pressure, the duration of the delivery impulses of the pump and consequently the duration of the periodic openings of the relief valve.

It follows, therefore, that this novel combination, which retards or advances the point at which effective compression begins as the intake pressure of the compressor increases or decreases, controls the operation of the compressor so that an approximately constant value is obtained for the power absorbed by the compressor.

This invention is capable of various mechanical embodiments one of which is shown more or less schematically in the accompanying drawing. This illustrative embodiment of the present invention is shown in the drawing and is described hereinafter for the purpose of illustrating the invention and should not be construed as defining or limiting the same. Reference should therefore be had to the appended claims to determine the scope of this invention.

Figure 1:
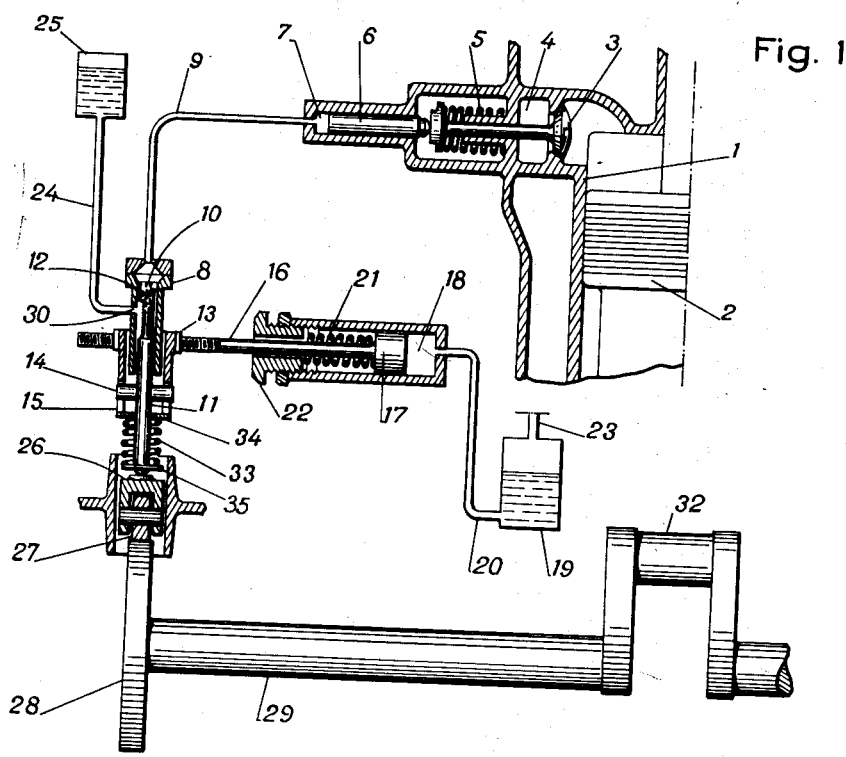
Fig. 1 is a diagrammatic view of an embodiment of the present invention.

In the drawing, the first cylinder of a multiple stage compressor or the single cylinder of a single stage compressor of positive displacement type is shown at 1 and is provided with a conventional piston 2. A relief valve 3 mounted in the upper end of cylinder 1 connects the latter with a suitable chamber 4 itself connected to the intake of the compressor. Valve 3 is held in closed position by spring 5.

Piston 6, mounted in a suitable cylinder 7, which may be a part of the housing surrounding spring 5, engages relief valve 3 to open the same against the action of spring 5 and is moved in cylinder 7 by liquid under pressure provided by a pump generally indicated at 8. Pump 8 is connected to cylinder 7 through a suitable conduit 9.

Pump 8 includes any suitable pump body in which a plunger 11 is working. Plunger 11 is provided at its upper end with an inclined ramp 12. A conduit 10 is formed in plunger 11 to connect the chambers above and below ramp 12. Plunger 11 may be rotated through a part of a revolution by pins 14 which are carried in slots 15 provided in the skirt of a pinion 13 which in turn engages and is rotated by a rack 16. Rack 16 is formed integrally with or is connected to a piston 17 working in a cylinder 18. Piston 17 is subject to the pressure of a liquid provided in reservoir 19. Reservoir 19 is connected to cylinder 18 by a suitable conduit 20. A spring 21 is provided to urge piston 17 to the right, as seen in the drawing, and the tension of spring 21 is adjustable by suitably adjusting the position of nut 22. The upper part of reservoir 19 is suitably connected as by conduit 23 with the intake of the compressor.

A spring 33 is interposed between a washer 34 mounted beneath pinion 13 and a flange 35 secured to piston 11 to urge piston 11 in a downward direction.

Figure 2:
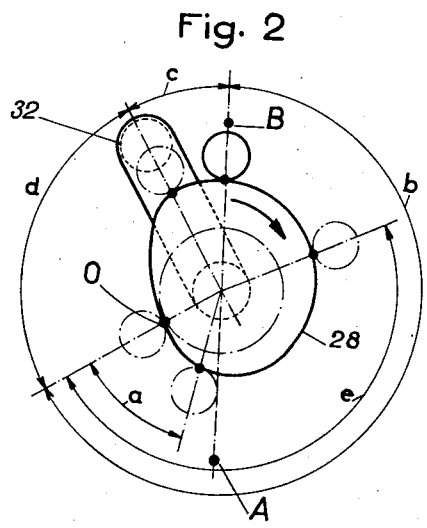
Fig. 2 is a diagrammatic side view of the cam actuating the piston of the pump showing its angular position to the crank pin.

In Fig. 2, which shows a diagrammatic side view of cam 28 and its position with respect to crank pin 32 of the crank shaft which drives the piston 2 of the compressor, the angles $a$, $b$, $c$, and $d$ indicate the portions of the profile of the cam which control the movement of the piston 11 of the pump.

The angle $a$ corresponds to the smallest stroke of the piston for which the ramp 12 uncovers the orifice 30 after having it covered; this stroke of the piston has caused a partial opening of the valve 3 before the crank pin 32 has arrived at the lower dead center A (the end of the suction stroke of the piston 2).

The angle $b$ corresponds to the position of the piston 11 at which the lower portion 31 of the ramp 12 is located directly below the level of the orifice 30 whatever the angular position of ramp 12.

The angle $c$ corresponds to a small additional upward movement of piston 11 which ends when crank pin 32 reaches its upper dead center B (end of the compression).

The angle $d$ corresponds to the downward stroke of piston 11; it represents the displacement between crank pin 32 and the start O of the cam.

The angle $e$ corresponds to a partial upward movement of piston 11 at the moment when piston 11 uncovers the orifice 30 for one of the intermediate angular positions which the ramp 12 can occupy.

Figure 3:
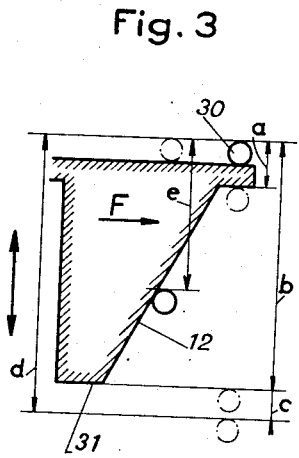
Fig. 3 is a diagrammatic showing in larger scale of the positions of the ramp, and of the piston for the several angular positions of its actuating cam.

In Fig. 3, which shows diagrammatically the developed profile of the ramp 12 and the relative vertical positions of this ramp in relation to the orifice 30, the vertical distances $a$, $b$, $c$ and $d$ correspond respectively to the angles of rotation $a$, $b$, $c$ and $d$ of the cam 28 as seen in Fig. 2. The arrow F indicates the direction of the angular displacement of the ramp 12 for an increase of the suction pressure.

Pump 8 is provided with liquid from the reservoir 25 which contains liquid under slight pressure. Reservoir 25 is connected to pump 8 by conduit 24.

A suitable cam follower 26 engages piston 11 and is provided with a cam roller 27 which follows a suitable cam 28 carried by crank shaft 29 of the compressor. This arrangement of cam 28 and cam follower 26 engaging piston 11 raises the same in pump 8 for each turn of the crank shaft 29 of the compressor.

With this illustrative embodiment of the present invention set up as described, when the compressor is started and crank shaft 29 is rotated by the motor driving the compressor the liquid in reservoir 19 is subject to the pressure in the intake of the compressor and this liquid acts on piston 17, and against the action of spring 21, to vary the position of piston 17 for each value of the said intake pressure. Displacement of piston 17 is transmitted by rack 16 to pinion 13 which in turn rotates plunger 11 and angularly displaces ramp 12.

Ramp 12 thus occupies different angular positions with respect to orifice 30 through which the conduit 24 opens into the body of the pump 8.

During each compression stroke piston 11 is elevated by cam 28 and executes its entire upward stroke $b$ plus $c$ and then it goes down under the action of the spring 33 (stroke $d$).

The ramp 12 first covers orifice 30 and the liquid which is above piston 11 is forced through the conduit 9 toward the chamber 7 where it opens valve 3.

When the suction pressure is at its lowest predetermined value piston 17 and rack 16 rotate ramp 12 so that when piston 11 has completed the vertical stroke $a$ (Fig. 3) ramp 12 will uncover orifice 30 before crank pin 32 has reached its lower dead center A (end of the suction). The liquid which is located above piston 11 can flow out through the conduit 10 by the action of spring 5 upon piston 6 and toward the reservoir 25. The valve 3 is then closed and the effective compression takes place during the entire upward stroke of the piston 2.

When the suction pressure is at its highest predetermined value rack 16 has rotated ramp 12 in such a manner that orifice 30 is not uncovered by the lower portion 31 of ramp 12 until piston 11 has completed stroke $b$ (Fig. 3). Valve 3 is closed and the effective compression starts in cylinder 1 of the compressor; it is effective until crank pin 32 arrives at its upper dead center B, while piston 11 completes its stroke $c$.

When the suction pressure is at an intermediate value between the lowest and highest predetermined pressures the position of ramp 12 is such that its inclined portion uncovers orifice 30 after a stroke $e$ of piston 11; valve 3 is closed and at this moment the effective compression begins in the cylinder 1.

The predetermined values under which the device functions as indicated above can be modified either by adjusting regulator nut 22 or by modifying the characteristics of the spring 21.

Increase or decrease in the duration of the periodic openings of relief valve 3 retards or advances the point at which effective compression in cylinder 1 of the compressor begins, thus providing an almost constant pressure and an almost constant power demand by the compressor.

It will now be apparent to those skilled in the art that by the present invention there is provided a novel automatic regulator for compressors which by means of a relatively simple structure provides an efficient and reliable control of a relief valve in a cylinder of the compressor to maintain the pressure of the compressor approximately constant and thus to keep at constant level the power required from the engine driving the compressor.

Changes to or modifications of the above described illustrative embodiment of this invention may now be apparent to those skilled in the art and reference should be had to the appended claims to determine the scope thereof.

What is claimed is:

1. In a regulator for compressors including a cylinder, a piston in said cylinder, a crankshaft for reciprocating the piston and driving means for rotating the crankshaft, a relief valve in the cylinder, hydraulic means for opening said valve, a variable discharge pump supplying liquid under pressure to said hydraulic means, cam means driven by the crankshaft for energizing said pump and hydraulic means including a piston responsive to the pressure in the intake of the compressor for increasing and decreasing the volume of discharge of said pump as the intake pressure increases and decreases.

2. A regulator as described in claim 1 in which said pump includes a plunger reciprocated by said cam means, means carried by said plunger to control the volume of fluid delivered by said pump and means connecting said control means and said pressure responsive means.

3. A regulator described in claim 1 in which said pump includes a plunger reciprocated by said cam means, a conduit through said plunger and means for rotating said plunger connected to said pressure responsive means to control fluid flow through said conduit.

4. A regulator as described in claim 3 in which said means for rotating said plunger includes resilient means biasing said piston in one direction said hydraulic means moving said last named piston in the opposite direction.

5. A regulator as described in claim 4 in which said pump plunger is rotated by a pinion in which it is mounted for reciprocation, a rack rotating said pinion and means for connecting said rack and said last named plunger.

6. In a regulator for compressors including a cylinder, a piston in said cylinder, a crankshaft for reciprocating the piston and driving means for rotating the crankshaft, a relief valve in the cylinder, hydraulic means for opening said relief valve, resilient means for closing said valve, a variable discharge pump supplying fluid under pressure to said hydraulic means, a plunger in said pump, a conduit through said plunger, a source of supply of fluid for said pump, an inclined surface carried by said plunger for rotation therewith to control communication between said conduit and said source, a cam carried by the crankshaft for reciprocating said plunger and means responsive to the pressure in the intake of the compressor for rotating said plunger and said surface to control the volume of the fluid supplied by said pump to said hydraulic means.

7. A regulator as described in claim 6 in which said means for rotating said plunger and said surface includes a cylinder, a piston in said cylinder, means reciprocated by said second piston for rotating said plunger, and a source of fluid for said last named cylinder communicating with the intake of the compressor.

8. A regulator as described in claim 7 in which said last named piston is resiliently biased in one direction.

9. In apparatus for actuating a pressure relief valve in a positive displacement type of compressor in accordance with the pressure existing in the intake of the compressor, a pump driven by the crankshaft of the compressor, hydraulic means connected to said pump for opening said relief valve, means for controlling the volume of liquid supplied by said pump to said hydraulic means and hydraulic means including a piston for energizing said controlling means responsive to the pressure existing in the intake of the compressor.

10. Apparatus as described in claim 9 in which said pump includes a plunger, a conduit in said plunger permitting escape of liquid from above said plunger, means for rotating said plunger to open and close said conduit, and means connecting said rotating means to said piston.

JOSEPH ABEL BOREL.

References Cited in the file of this patent

UNITED STATES PATENTS

| Number | Name | Date |
| --- | --- | --- |
| 2,134,835 | Nordberg | Nov. 1, 1938 |
| 2,301,464 | Schweitzer | Nov. 10, 1942 |
| 2,412,503 | Gerteis | Dec. 10, 1946 |
| 2,470,380 | Turnwald | May 17, 1949 |

FOREIGN PATENTS

| Number | Country | Date |
| --- | --- | --- |
| 51,598 | Austria | 1912 |